United States Patent [19]

Yamada et al.

[11] Patent Number: 5,507,854
[45] Date of Patent: Apr. 16, 1996

[54] METHOD AND APPARATUS FOR MEAUSRING DISPLACEMENT OF MOLTEN METAL

[75] Inventors: Takeo Yamada, Kanagawa; Masao Sugawara, Tokyo; Kouichi Matsumoto, Tokyo; Akio Nagamune, Tokyo; Kouichi Tezuka, Tokyo, all of Japan

[73] Assignees: Nireco Corporation; NKK Corporation, both of Tokyo, Japan

[21] Appl. No.: 353,888

[22] Filed: Dec. 12, 1994

[30] Foreign Application Priority Data

Dec. 27, 1993 [JP] Japan ............................ 5-330385

[51] Int. Cl.$^6$ .................................................... C21C 1/04
[52] U.S. Cl. ............................... 75/387; 266/94; 266/99
[58] Field of Search .................... 266/94, 99, 78; 75/375, 387; 164/4.1

[56] References Cited

U.S. PATENT DOCUMENTS 4,150,974  4/1979  Kemlo ........................................ 266/94
4,728,875  3/1988  Murthy ...................................... 164/4.1

FOREIGN PATENT DOCUMENTS 1488317  6/1989  U.S.S.R. .................................... 266/94

*Primary Examiner*—Scott Kastler
*Attorney, Agent, or Firm*—Ladas & Parry

[57] ABSTRACT

First and second electrodes are inserted into molten metal. A first pseudo random signal is transmitted to the first electrode, and at the same time the first pseudo random signal and a second pseudo random signal which has the same pattern as the first pseudo random signal but which is slightly different in frequency from the first pseudo random signal are multiplied by each other in a first multiplier to thereby calculate a first product value. A signal obtained from the second electrode and the second pseudo random signal are multiplied by each other in a second multiplier to thereby obtain a second product value. The displacement of the molten metal is calculated from the time difference between maximum correlation values respectively appearing in time series patterns of the first and second product values.

6 Claims, 7 Drawing Sheets

METHOD AND APPARATUS FOR MEAUSRING DISPLACEMENT OF MOLTEN METAL

BACKGROUND OF THE INVENTION

1. Field of the invention

The present invention relates to a method and an apparatus for measuring displacement of molten metal, and particularly to a method and an apparatus for measuring the level of molten metal in a furnace.

2. Description of the Related Art

It is possible to improve the quality of products by controlling the level of molten metal in a mold of a continuous casting furnace to be constant. In order to control the level of molten metal to be constant, there have been proposed and used a variety of systems such as a range finder of the electromagnetic induction system, a range finder of the system using radiation, a range finder of the optical system, and so on. In these systems for measuring distance, in view of their object to control the level of molten metal, particularly the reproducibility has been regarded as important, but the measurement of a large level displacement has not been regarded as very important.

Recently, in the movement of seeking the automatization of equipment and the further improvement of the quality of products, it has come necessary to measure the level of molten metal until the molten metal is established to have a predetermined control level at the beginning of casting. In this measurement of level in the beginning, the displacement of the level is so large that requirements cannot be satisfied in the above-mentioned conventional systems. Accordingly, study and development are being advanced to obtain improvements of those conventional systems or to obtain new systems.

Description will be made under with respect to the conventional systems and the systems which are being developed.

① Electromagnetic Induction System (Eddy Current System)

By use of a transmission coil (excitation coil) and a reception coil, a magnetic field is generated on the surface of molten metal so that the influence of the magnetic field due to an eddy current generated in the surface of the molten metal is used for measuring the level of the molten metal. This system is high in accuracy of measurement, so that it currently used mainly for controlling the level of molten metal.

② Thermocouple System

A thermocouple is buried inside a mold, and the level of molten metal is measured on the basis of the temperature change caused by the heat of the molten metal.

③ Ultrasonic Wave System

An ultrasonic wave is radiated into the molten metal, and the distance is obtained on the basis of the time required for the reflected wave to return.

④ Electrode System

An electrode is put into a mold so that the level when molten metal contacts the electrode is outputted.

⑤ Electromagnetic Wave System

A transmission/reception antenna is provided above a mold so that an electromagnetic wave is radiated toward the surface of molten metal and the reflected wave is received to thereby measure the level of the molten metal on the basis of the propagation time of the electromagnetic wave. This system is disclosed in Japanese Patent Unexamined Publication (JP-A) No. Hei-2-98685, and Japanese Patent Unexamined Publication (JP-A) No. Hei-2-145985.

These systems have problems as follows.

① Electromagnetic Induction System

Since the displacement of the level of molten metal which can be measured is about 200 mm at the most, it is impossible to measure the level displacement between the level in the beginning of running which displaces more than the above limit of about 200 mm and a predetermined control level. In addition, a protective pipe of ceramics or the like is provided around coils in order to protect the coils from the heat of the molten metal. This protective pipe has a low tolerance against impact. Accordingly, if molten metal adheres to the protective pipe, the protective pipe cannot be used any longer and must be replaced, and the cost is therefore high.

② Thermocouple System

Responsibility is inferior. In addition, since necessary to bury a thermocouple inside a mold, it costs much to maintain the system.

③ Ultrasonic Wave System

The speed of sound changes depending on temperature, and hence the system receives a large influence from the heat inside the mold. Accordingly, this system has not been put into practical use yet.

④ Electrode System

One electrode can measure only one level position. It is therefore necessary to provided electrodes respectively for various level positions to be measured.

⑤ Electromagnetic Wave System

Generally, in a small space such as that in a mold, there is an influence of multiple reflection of an electromagnetic wave and it is therefore difficult to measure the level of molten metal. In addition, the space around the mold is small and there is therefore no space to install an antenna therein.

SUMMARY OF THE INVENTION

It is an object of the present invention to solve the foregoing problems.

It is another object of the present invention to provide a method and an apparatus for measuring displacement of molten metal, by which the displacement of the level of a molten metal having electrical conductivity can be measured up to large amounts.

In order to attain the foregoing objects, according to an aspect of the present invention, in the method of measuring displacement of molten metal, electrodes are inserted into the molten metal, and the displacement of the level of the molten metal is measured on the basis of a change in transmission time of a transmission signal due to the level displacement of the molten metal. First, first and second electrodes are inserted into molten metal having electrical conductivity. Next, a first pseudo random signal is transmitted to the first electrode, and the first pseudo random signal is multiplied by a second pseudo random signal which has the same pattern as the first pseudo random signal but which is slightly different in frequency from the first pseudo random signal to thereby obtain a first product value. The second pseudo random signal is multiplied by a signal obtained through the second electrode to thereby obtain a second product value. Finally, the displacement of the molten metal is calculated on the basis of the time difference between the maximum correlation values respectively appearing in time series patterns of the first and second product values.

According to a second aspect of the present invention, the apparatus for measuring displacement of molten metal comprises: a first pseudo random signal generating means for generating a first pseudo random signal; a second pseudo random signal generating means for generating a second pseudo random signal which has the same pattern as the first pseudo random signal but which is slightly different in frequency; a first electrode inserted into molten metal having electrical conductivity and connected to the first pseudo random signal generating means; a second electrode inserted into the molten metal; a first multiplier for multiplying the outputs of the first and second pseudo random signal generating means by each other to obtain a first product value as an output thereof; a second multiplier connected to the second electrode so as to multiply the output of the second electrode by the output of the second pseudo random signal generating means to thereby obtain a second product value as an output thereof; and an arithmetic operation means for obtaining a time difference between maximum correlation values respectively appearing in time series patterns of the first and second product values to thereby calculate displacement of the molten metal.

Preferably, the first pseudo random signal generating means is driven by a first clock generating means which is constituted by a first oscillator for generating an oscillation of a frequency $\underline{a}$, a common oscillator for generating an oscillation of a frequency $\underline{c}$ which is sufficiently higher than the frequency $\underline{a}$, a first mixer for mixing the output of the common oscillator with the output of the first oscillator, and a first band pass filter for obtaining an output of a frequency (c+a) from the output of the first mixer; and the second pseudo random signal generating means is driven by a second clock generating means which is constituted by a second oscillator for generating an oscillation of a frequency a' which is slightly different from the frequency $\underline{a}$, a second mixer for mixing the output of the common oscillator and the output of the second oscillator, and a second band pass filter for obtaining an output of a frequency (c+a') from the output of the second mixer.

The first and second pseudo random signals are identical in pattern with each other but are slightly different in frequency. The time series pattern of the first product value takes the maximum correlation value when the respective pulses of the first and second pseudo random signals coincide with each other in each period, the maximum correlation value being the maximum value. This maximum value is generated with a period T.

The period T is expressed by:

$$T = k/\Delta f \quad (1)$$

Here, k is a constant which represents the number of bits (the number of clocks) constituting one period of the first and second pseudo random signals M1 and M2. Δf is a difference between a clock frequency f1 of one bit of the signal M1 and a clock frequency f2 of one bit of the signal M2, and is expressed by:

$$\Delta f = f1 - f2 \quad (2)$$

The time series pattern of the second product value also has the maximum value with the period T. Transmitted through the first electrode, the molten metal and the second electrode, the first pseudo random signal M1 is more delayed by time Td than the second pseudo random signal M2. Therefore, the maximum value as more delayed by time X than that of the first product value as shown in FIG. 7.

The time X is expressed by:

$$X = (Td/\Delta t) \times P2 \quad (3)$$

$$\Delta t = P2 - P1 \quad (4)$$

Here, P1 represents a period of M1, and P2 represents a period of M2.

Since the time Td changes in accordance with the displacement of of the level of molten metal, the displacement of the level of the molten metal can be obtained if X is measured to obtain Td by the expression (3). If the displacement of the level is known, a reference position can be determined, and the distance from this reference position to the measured level can be also obtained. In addition, in the expression (3), if the value of Δt is made smaller than Td, and if the value of P2 is made large, the value of Td can be magnified by P2/Δt so that it is possible to perform measurements with a high accuracy. In addition, in the measurement according to the present invention, signals are transmitted inside electrodes and molten metal without using any reflection system which has been used in the conventional case. Accordingly, it is possible to obtain a large S/N ratio and there is no influence of multiple reflection, so that it is possible to measure the level of molten metal with a high accuracy.

DETAILED DESCRIPTION OF THE PREFERRED EMBODIMENT

An embodiment of the present invention and a method of calculating the above-mentioned expressions will be described.

Figure 1:
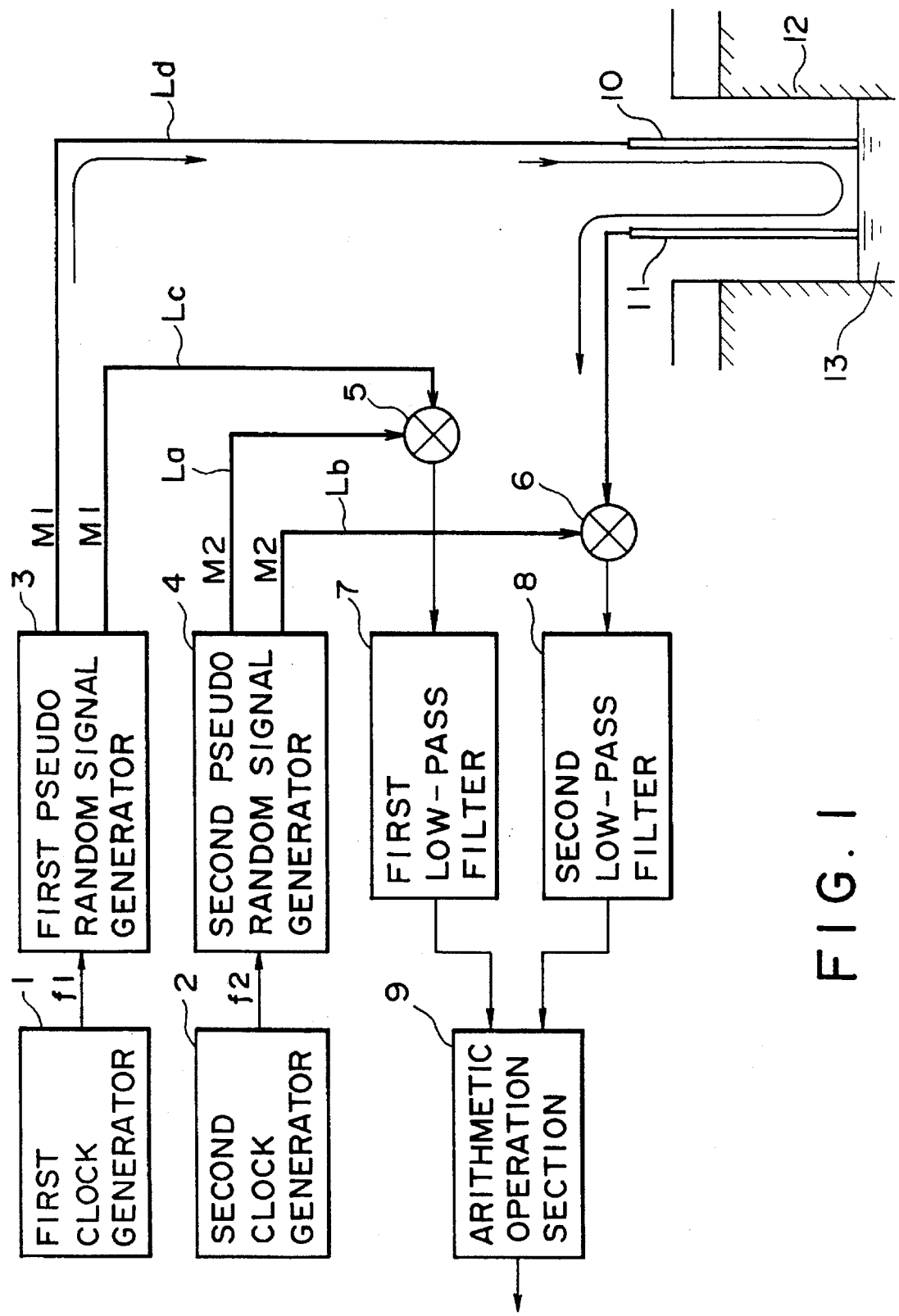
FIG. 1 is a block diagram illustrating the configuration of an embodiment of the present invention.
Figure 2:
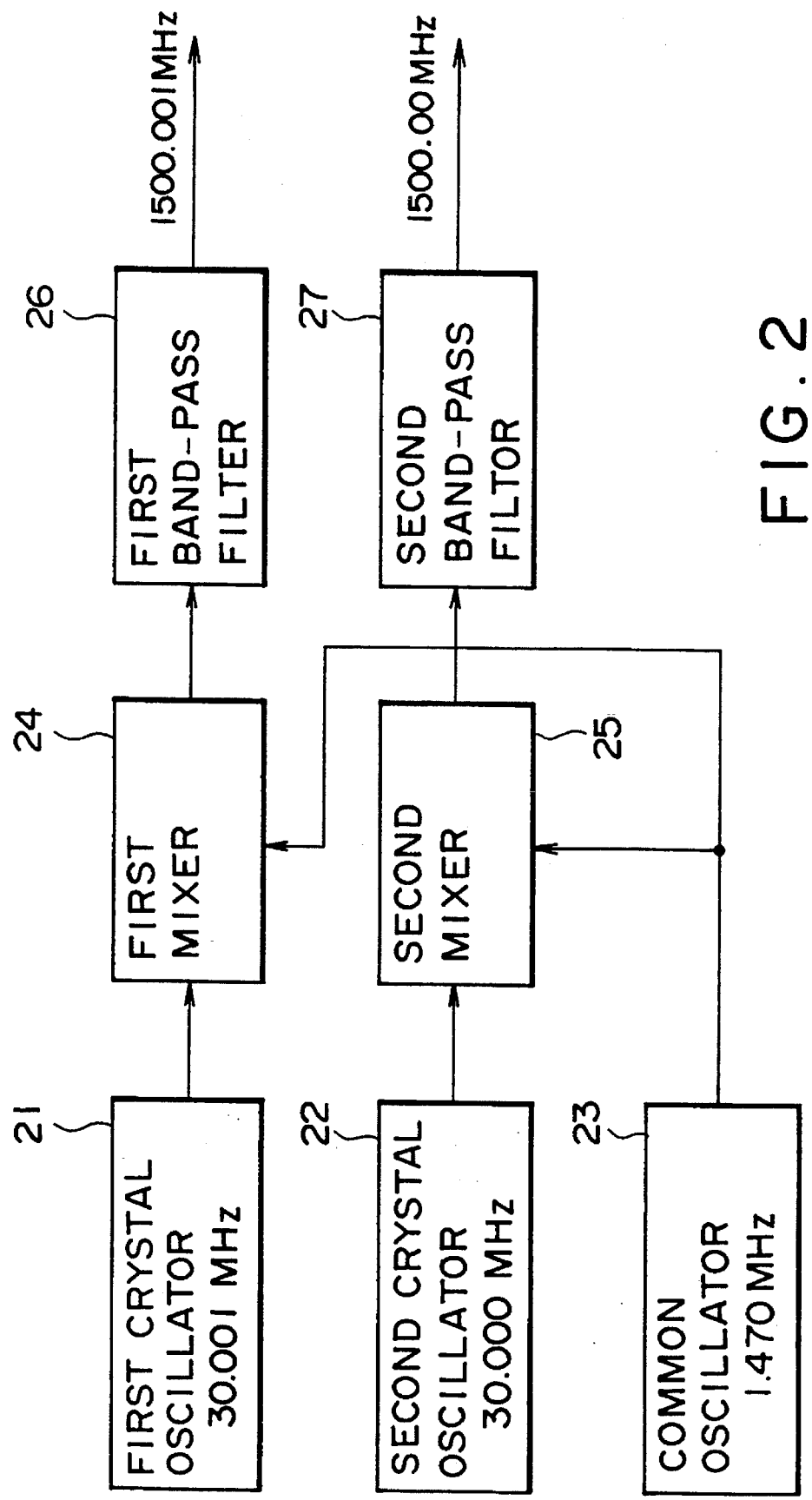
FIG. 2 is a block diagram illustrating the configuration of a clock generator.

FIG. 1 shows the configuration of an embodiment of the present invention, and FIG. 2 shows the configuration of a clock generator. A first clock generator 1 generates a frequency f1, and a second clock generator 2 generates a frequency f2, the frequency f2 being slightly smaller than the frequency f1. A first pseudo random signal generator 3 generates a first pseudo random signal M1 with a period P1, and a second pseudo random signal generator 4 generates a second pseudo random signal M2 having the same pattern as the signal M1 and having a period P2 which is slightly different from the period P1. A first multiplier 5 multiplies the signal M1 supplied from the first pseudo random signal generator 3 through a transmission line Lc by the signal M2 supplied from the second pseudo random signal generator 4 through a transmission line La. A second multiplier 6 multiplies the signal M1 supplied from the first pseudo random signal generator 3 through a transmission line Ld by the signal M2 supplied from the second pseudo random signal generator 4 through a transmission line Lb.

A first low pass filter 7 eliminates a high frequency component from the output of the first multiplier 5, and outputs a time series pattern having a period between maximum correlation values. In the same manner, a second low pass filter 8 eliminates a high frequency component from the output of the second multiplier 6, and outputs a time series pattern having a period between maximum correlation values. An arithmetic operation section 9 calculates the level of molten metal from the time difference between maximum correlation values of the time series patterns of the first and second low pass filters 7 and 8.

First and second electrodes 10 and 11 partially inserted into molten metal 13 in a mold 12 are provided on the transmission line Ld so that the electrodes 10 and 11 are electrically connected to each other through the molten metal 13.

FIG. 2 shows the configuration of the first and second clock generators 1 and 2. A first crystal oscillator 21 generates a frequency fa, for example, 30.001 MHz, a second crystal oscillator 22 generates a frequency fb, for example, 30.000 MHz, and a common oscillator 23 generates a frequency fc, for example, 1,470 MHz. A first mixer 24 is, for example, constituted by a balanced modulator or the like, outputting a signal of a frequency fc±fa. A second mixer 25 outputs a signal of a frequency fc±fb. A first band pass filter 26 passes the frequency fc+fa which is the output of the first mixer 24, and a second band pass filter 27 passes the frequency fc+fb which is the output of the second mixer 25.

A signal of 30.001 MHz outputted from the first crystal oscillator 21 and a signal of 1,470 MHz outputted from the common oscillator 23 are mixed in the first mixer 24 so that two signals of 1,500.001 MHz and 1,439.999 MHz are outputted. Of those signals, the signal of 1,500.001 MHz is passed through the first band pass filter 26 so as to be outputted as a first clock frequency f1. In the same manner, a signal of 30.000 MHz outputted from the second crystal oscillator 22 and a signal of 1,470 MHz outputted from the common oscillator 23 are mixed in the second mixer 25 so that two signals of 1,500.000 MHz and 1,440.000 MHz are outputted. The two signals of 1,500.000 MHz and 1,440.000 MHz are passed through the second band pass filter 27 so that a second clock frequency f2 of 1,500.000 MHz is outputted. By such a configuration, the difference between the frequencies f1 and f2 is kept to be 1 KHz accurately.

Figure 7:
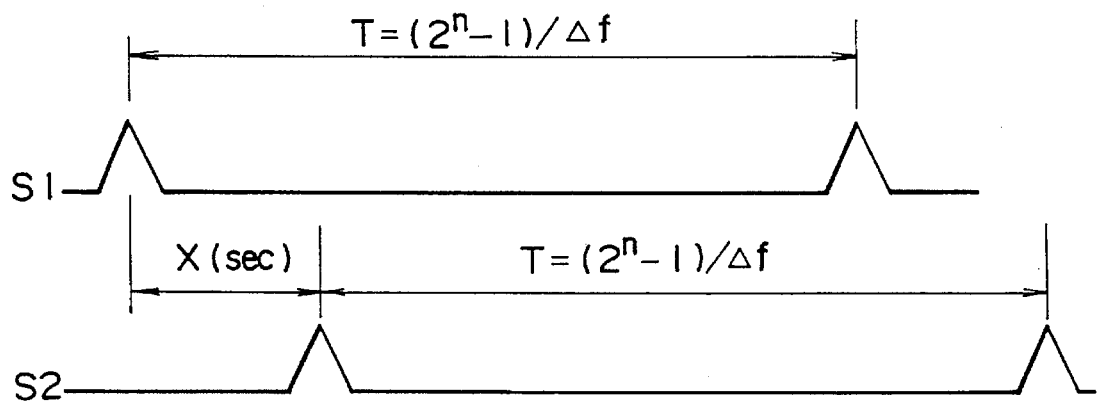
FIG. 7 is a diagram illustrating an output S1 of a first low pass filter and an output S2 of a second low pass filter.

According to the above-mentioned conventional clock generator disclosed in Japanese Patent Unexamined Publication (JP-A) No. Hei-2-145985, band pass filters 29-1 and 29-2 in FIG. 7 of the same Publication must have a band pass filter characteristic which is accurate enough to separate 3.001 MHz and 2.999 MHz. It has been therefore difficult to design the circuit. According to the above-mentioned configuration shown in FIG. 2, on the contrary, a difference of 1 KHz is provided between the first and second crystal oscillators 21 and 22 as local oscillators, and a very large difference of 60 MHz is provided between the frequencies outputted from the mixers 24 and 25. Accordingly, the first and second band pass fitters 26 and 27 are not required to have such accurate characteristics, and they can be realized by general filters, such as SAW filters, crystal filters, or the like.

Figure 3:
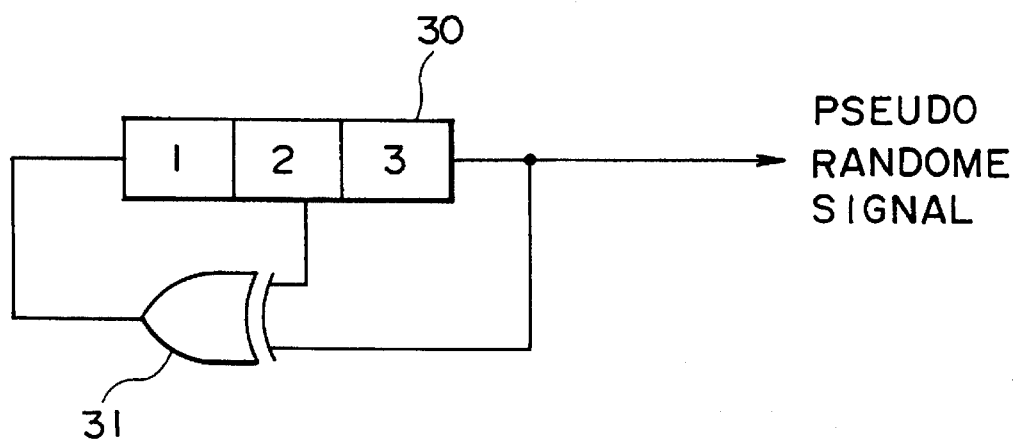
FIG. 3 is a diagram illustrating an example of a pseudo random signal generator.

FIG. 3 explains the configuration of the first and second pseudo random signet generator (Maximal-length sequence signal generator).

Figure 4:
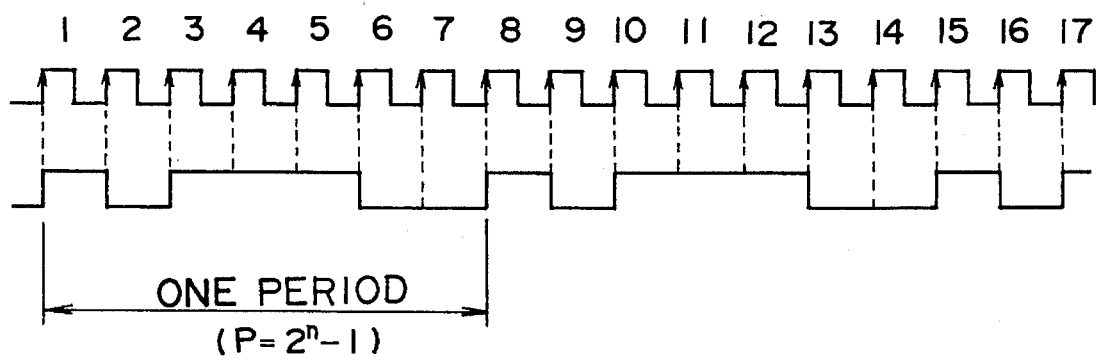
FIG. 4 is a diagram illustrating the state where a 3-stage shift register outputs a pseudo random signal.

The drawing is a diagram illustrating the configuration of a M-sequence signal generator of 3 bits. Although the case of 3 bits is shown herein in order to facilitate the description, a shift register of more bits such as 7 bits may be used. The M-sequence signal generator is constituted by a shift register 30 formed of flip-flops synchronized with a clock signal, and an exclusive OR circuit 31 having inputs supplied with signals from the finer and preceding stages of the shift register 30 and an output which supplies a signal to the first stage of the shift register FIG. 4 shows an M-sequence signal in the case where the 3-stage shift register shown in FIG. 3 is used. The number of clocks (the number of bits) in one period can be expressed by $P=2^n-1$ if the number of stages is n. Therefore, n=3 and hence P=7 in the case of the 3-stage shift register.

Assuming that the clock frequency of one bit of the first pseudo random signal M1 generated from the first pseudo random signal generator 3 shown in FIG. 1 is f1, and that the clock frequency of one bit of the second pseudo random signal M2 generated from the second pseudo random signal generator 4 is f2, then the periods P1 and P2 of the signals M1 and M2 are expressed by:

$$P1=(2^n-1)/f1,$$

$$P2=(2^n-1)/f2 \qquad (5)$$

The time difference $\Delta t$ in one period between the pseudo random signals M1 and M2 is expressed by:

$$\begin{aligned}\Delta t &= P2-P1 \qquad (6)\\ &= (2^n-1)(f1-f2)/(f1 \cdot f2)\end{aligned}$$

Here, f1>f2. In particular, when f1=1,500.001 MHz, f2=1,500.000 MHz, and the shift register has seven stages:

$$\begin{aligned}P1 &= (2^n-1)/f1\\ &= (2^7-1)/1,500.001 \times 10^6\\ &\approx 84,666.61022 \text{ (psec)}\\ P2 &= (2^n-1)/f2\\ &= (2^7-1)/1,500.000 \times 10^6\\ &\approx 84,666.66667 \text{ (psec)}\end{aligned}$$

The time difference $\Delta t$ in one period can be obtained as a very small difference from the expression (6) as follows.

$$\begin{aligned}\Delta t &= P2-P1\\ &\approx 0.0565 \text{ (psec)}\end{aligned}$$

Figure 5A:
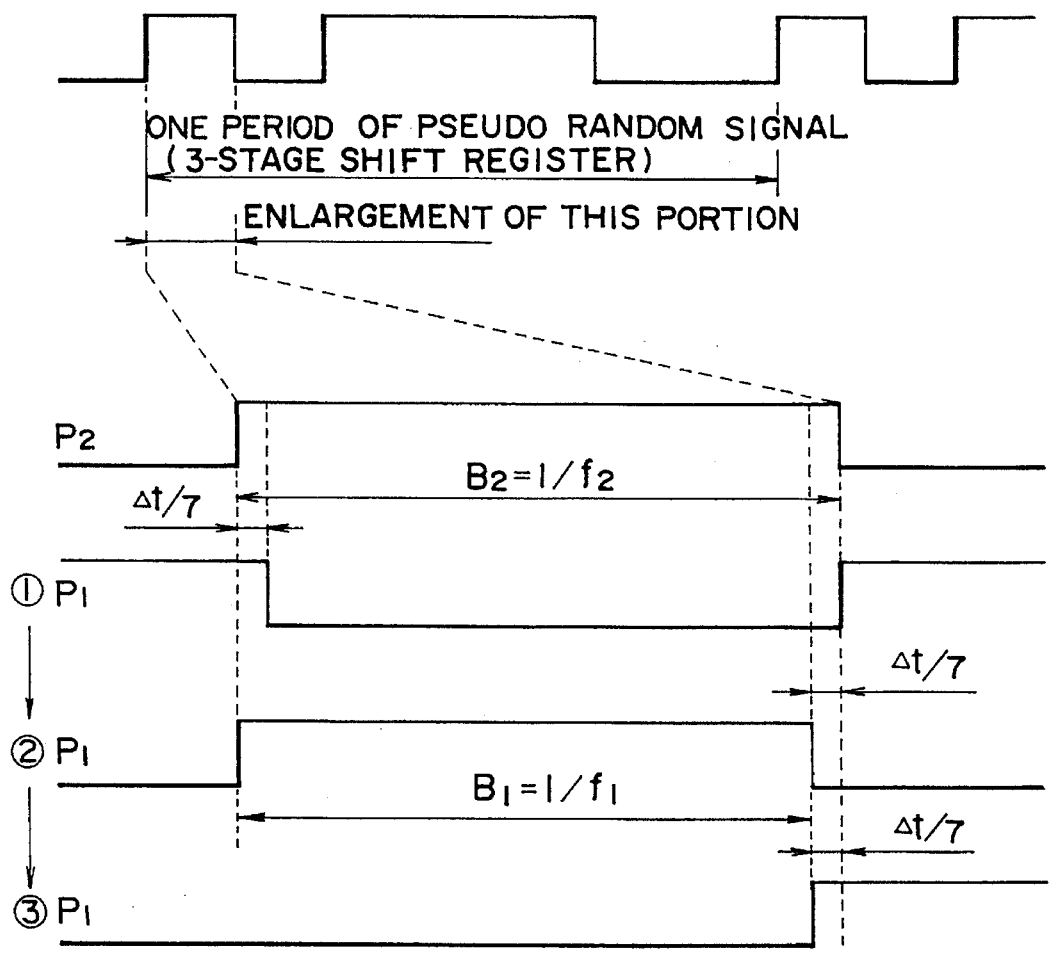
FIG. 5 is a diagram for explaining the output of correlation values.
Figure 5B:
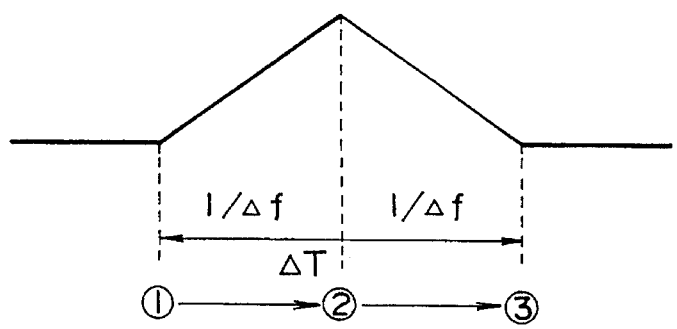

FIGS. 5A and 5B show correlation values obtained by the multipliers 5 and 6. The diagram of FIG. 5A shows the pseudo random signals M1 and M2 in one period in the 3-stage shift register shown in FIG. 4. The diagram of FIG. 5A shows also the expansion of one bit in the diagram, and shows the process where the respective first bits of the signals M1 and M2 change gradually from a first state in which they are shifted by one bit to a next state in which they come to coincide with each other, and then to a further state in which they become shifted by one bit again. The diagram of FIG. 5B shows correlation values then. In the diagram of FIG. 5A, the one period P2 of the signal M2 and the one period P1 of the signal M1 are shifted from each other by $\Delta t$ as shown in the expression (6). Each of the respective one periods P1 and P2 is constituted by seven bits. Accordingly, the respective first bits in the one periods P1 and P2 are shifted by $\Delta t/7$ from each other, and the respective seventh, the last, bits in the one periods P1 and P2 are shifted by $\Delta t$ from each other. The row ① shows the case where the signals M1 and M2 are shifted by one bit, ② shows the case where they are closest to each other, and ③ shows the case where they are shifted by one bit again. In the diagram (c) of FIG. 5, the ordinate indicates the size of correlation values corresponding to the above cases ①, ② and ③. This shows the outputs of the low pass filters 7 and 8 shown in FIG. 1, and the apex of the triangle means a maximum correlation value.

The pseudo random signals M1 and M2 correlate with each other when the phases of their periods P1 and P2 coincide with each other. That is, there is no correlation if the phases of the periods P1 and P2 are shifted by one or more bits. Therefore, assuming that the time per bit of M2 is B2, the time $\Delta T$ when M1 and M2 can correlate with each other is expressed by:

$$\begin{aligned} \Delta T &= 2(B2/\Delta t) \times P1 \\ &= 2(1/\Delta f) \end{aligned} \quad (7)$$

Here, $B2=1/f2$.

The $B2/\Delta t$ shows the number of periods P1 of M1 required for giving shift by one bit, and therefore the time corresponding to this number of periods can be obtained by multiplying this number by the period P1. Since such shift by one bit exists not only forward but also backward, the time thus obtained is further multiplied by 2.

Figure 6:
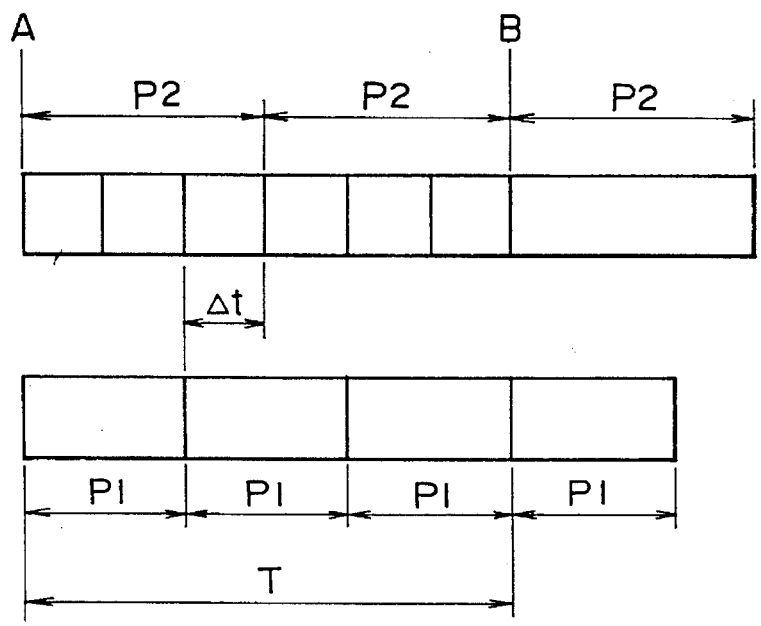
FIG. 6 is a diagram for explaining a method of calculating a correlation period T.

Next, time T (correlation period) to obtain correlation again after obtaining correlation once will be obtained. FIG. 6 shows the phase change of the period P1 relative to the period P2, in which $\Delta t$ is made to be a value larger than to P1 and P2 in order to facilitate description. As shown in the drawing, if P1 is repeated from a position A by the number of $\Delta t$ included in P2, it is possible to obtain a position B where the relationship between P2 and P1 is the same as that in the position A. Therefore, the time T is expressed by:

$$\begin{aligned} T &= (P2/\Delta t) \times P1 \\ &= (P2/(P2-P1)) \times P1 \\ &= (2^n - 1)/\Delta f \end{aligned} \quad (8)$$

The expression (8) correlates with the above-mentioned expression (1).

FIG. 7 shows the outputs of the first and second low pass filters 7 and 8 in FIG. 1. S1 represents the output of the first low pass filter 7, and S2 represents the output of the second low pass filter 8. S1 and S2 have maximum correlation values with the correlation period T. Assume that La to Ld represent the lengths of the transmission lines La to Ld respectively. When La=Lb and Lc=Ld, a phase difference X between S1 and S2 is zero. However, when Lc≠Ld, there appears a phase difference X corresponding to the difference between Lc and Ld.

Figure 8:
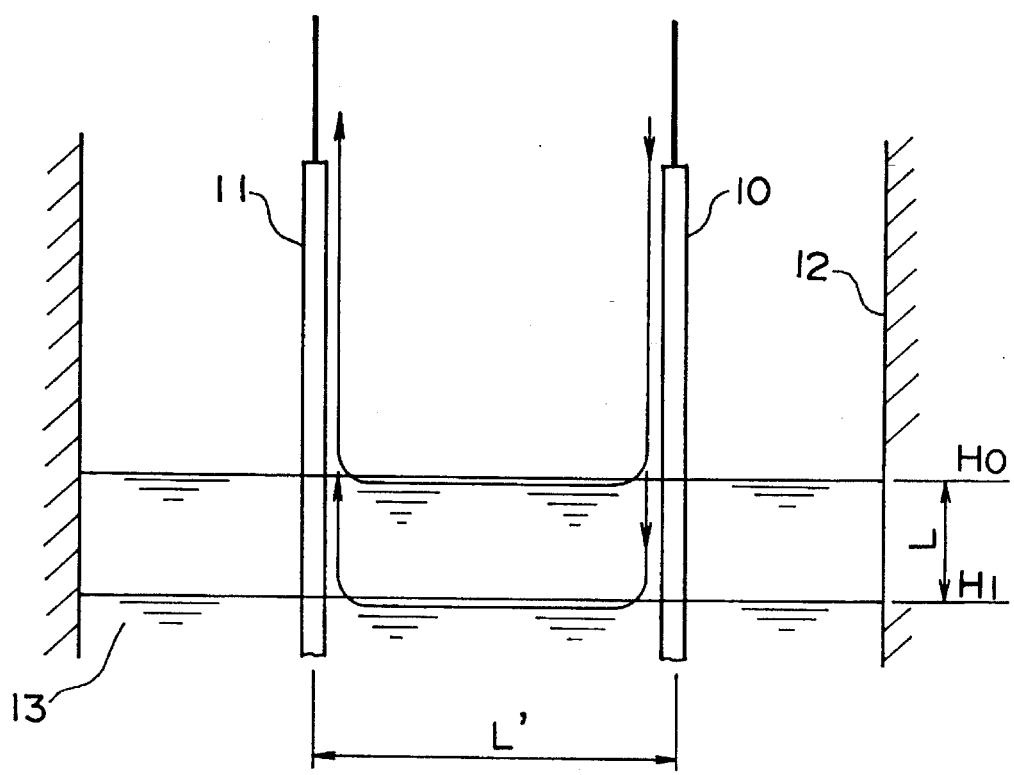
FIG. 8 is a diagram for explaining the level of molten metal and the distance of signal transmission.

FIG. 8 explains the change of Ld−Lc when the level of molten metal changes.

Assume:

when level H0: Ld−Lc=L' when level H1: Ld−Lc=2L+L'

If the level is displaced by L, the signal M1 transmitted from the first pseudo random signal generator 3 to the multiplier 6 is transmitted later than the signal M1 transmitted to the multiplier 5 by time Td (delay time) shown in the following expression.

$$Td=(2L+L')/V \quad (9)$$

Figure 9:
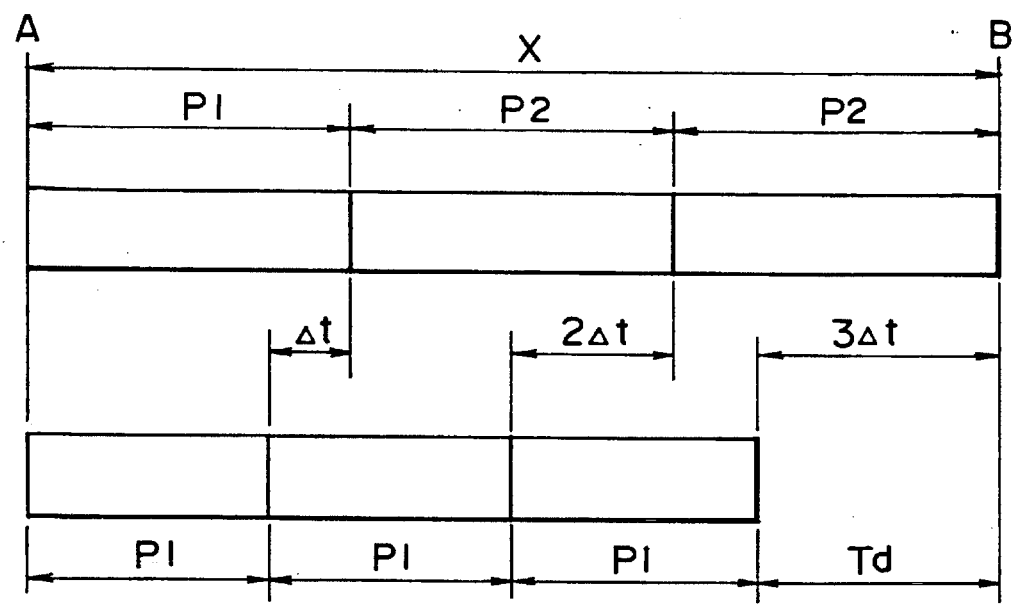
FIG. 9 is a diagram for explaining the calculation of a phase difference X.

Here, $V=3\times 10^8$ m/sec (speed of light), with which the signal M1 is transmitted through electrodes and molten metal. FIG. 9 shows the relationship between the delay time Td and the phase difference X. The phases of the periods P2 and P1 coincide with each other in the positions A and B. There appears a maximum correlation value of S1 in the position A, while there appears a maximum correlation value of S2 in the position B. There are n periods of P2 and P1 in the phase difference X respectively, and the difference between the n periods of P2 and the n periods of P1 is expressed by $n\Delta t$. Since this $n\Delta t$ is equal to the delay time Td, the following expression is established.

$$Td = n\Delta t \quad (10)$$
Then $n = X/P2$, $$\begin{aligned} X &= (Td/\Delta t)P2 \quad (11) \\ &= Td \times f1/\Delta f \\ &= ((2L+L') \times f1)/(V \times \Delta f) \quad (12) \end{aligned}$$

This expression (11) correlates with the foregoing expression (3).

The level of molten metal is obtained by this expression (12). That is, first the level He as a reference is established. If the level displacement L at the level H0 is made 0, and if the phase difference X0 at the level H0 is obtained, L' can be obtained from the expression (12). Next, if the phase difference X1 in the level H1 lower than the reference level H0 by L is obtained, L can be obtained by substituting L' and X1 into the expression (12). If the level of the molten metal becomes greater than the level H0, the displacement L is calculated as a negative value.

Now if the molten metal level displacement L changes from L1 to L2, the phase differences X1 and X2 in the respective displacements are expressed by:

$$X1=((2L1+L') \times f1)/(V \times \Delta f) \quad (13)$$

$$X2=((2L2+L') \times f1)/(V \times \Delta f) \quad (14)$$

The quantity of change in the phase difference $\Delta X$ at that time is expressed by:

$$\begin{aligned} \Delta X &= X2-X1 \quad (15) \\ &= (2(L2-L1) \times f1)/(V \times \Delta f) \\ &= 2\Delta L \times f1/(V \times \Delta f) \end{aligned}$$

Here, $\Delta L=L2-L1$.

Consequently, the relationship between the phase difference change $\Delta X$ and the displacement difference $\Delta L$ can be obtained, so that it is possible to calculate $\Delta L$ from $\Delta X$. If $\Delta L$ is known, the quantity of displacement L from the reference level or the level of molten metal can be also calculated.

Next, the above-mentioned special values will be substituted for investigation.

① Make the number n of stages of a shift register of a pseudo random signal generator seven.

$$P=2^n-1=127$$

② Set clock frequencies.

f1=1,500.001 MHZ f2=1,500.000 MHz

③ Establish the displacement difference.

$\Delta L = 1$ mm

If the above-mentioned values are substituted into the expression (15), $$\begin{aligned}\Delta X &= (2\Delta L \times f1)/(V \times f1) \\ &= 2 \times 1 \times 10^{-3} \times 1{,}500 \times 10^{8}/(3 \times 10^{8} \times 1 \times 10^{3}) \\ &= 0.00001 \text{ (sec)} \\ &= 10 \times 10^{-6} \text{ (sec)}\end{aligned}$$

Normally, signal propagation time $\Delta X'$ per 1 mm is expressed by:

$$\begin{aligned}\Delta X' &= 2L/V \\ &= (2 \times 1 \times 10^{-3})/(3 \times 10^{8}) \\ &= 6.7 \times 10^{-12} \text{ (sec)} \\ \Delta X/\Delta X' &= 10 \times 10^{-6}/(6.7 \times 10^{-12}) \\ &= 1.5 \times 10^{6}\end{aligned}$$

Therefore, signal propagation time is delayed by about 1.5-million-fold, so that the signal processing can be made easier and more accurately.

Figure 10:
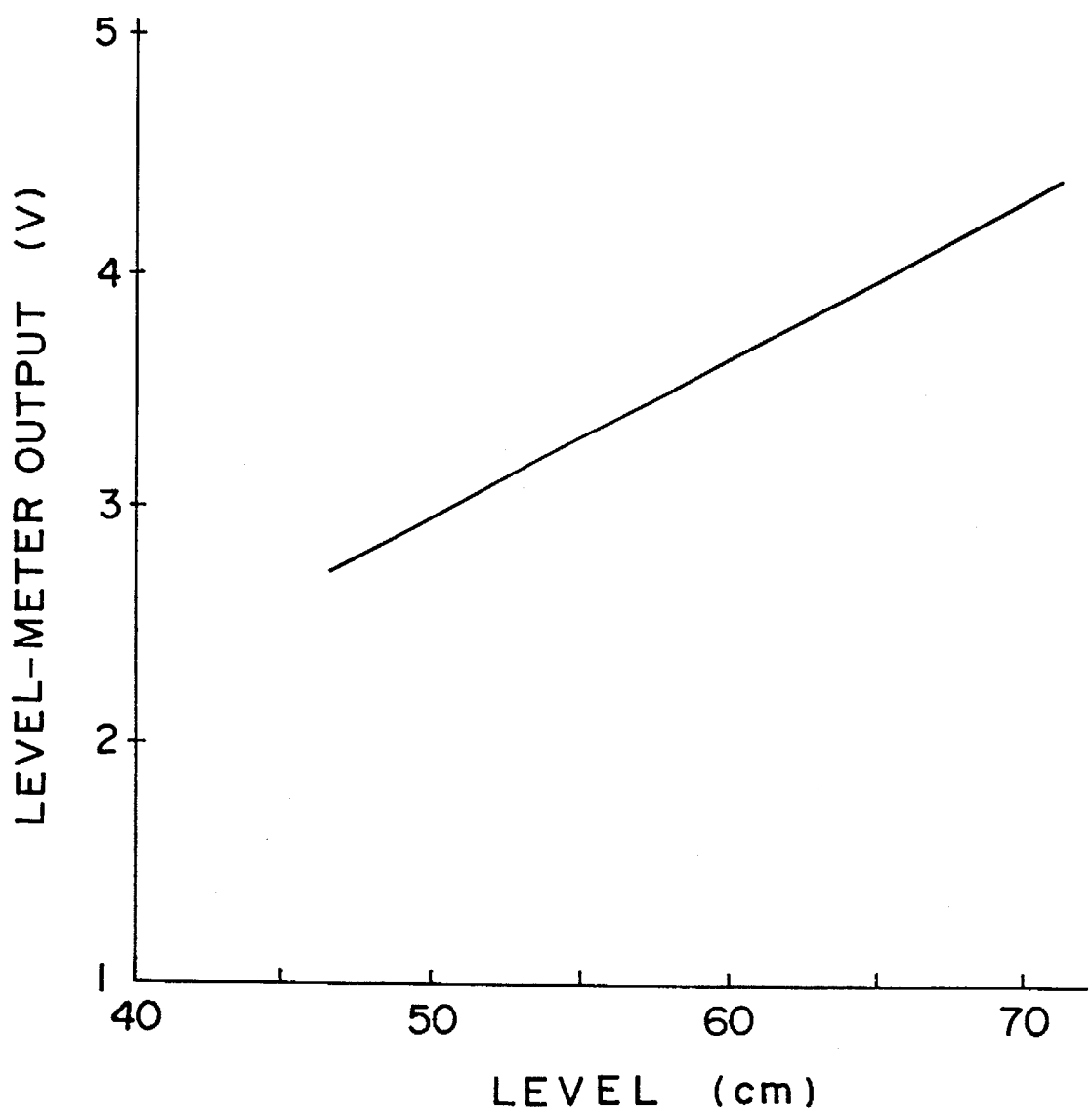
FIG. 10 is a diagram illustrating an example of actually measured values in the embodiment of the present invention.

FIG. 10 shows the result of level measurement according to this embodiment. The abscissa indicates the level of molten steel used as the molten metal, and the ordinate indicates the voltage representing a level measurement value. This measurement was performed under the conditions where f=1,500 MHz, Δf=1 KHz, and the number of stages of the shift register of the pseudo random signal generator was seven. In the experiment, the level or distance from a reference position could be processed easily and at a high speed by a process in which the phase difference X was introduced into a computer so as to operate in the computer.

Although the result of the experiment in which molten steel was used as the molten metal was shown in the above, various molten metals different in electrical conductivity were tested in further experiment, and the level or displacement could be measured accurately in those cases.

This system is effective when used at the time of start of running when the level of molten metal is greatly displaced, and an eddy current system which has high accuracy may be used after the level is once brought into a state in which the level is controlled to a predetermined value. However, if high accuracy is not required, this system may be used continuously. In the case of this system, as electrodes, metal with a higher melting point than the molten metal may be used, or otherwise metal may be fed into the molten metal automatically. If the same material as the molten metal is used as the electrodes, the electrodes do not have any influence on the molten metal even if the electrodes are melted.

As is apparent from the above description, according to the present invention, two electrodes are inserted into molten metal, and a signal is transmitted through a path including one electrode, the molten metal and the other electrode. Accordingly, the change of the level of the molten metal can be expressed by the change of transmission distance, and this change of transmission distance can be regarded as a delay time of the signal. Accordingly, if this delay time is expanded to a large value and then measured, the level of the molten metal can be measured accurately. Further, the present invention has the following effects.

① Since the electrodes and the molten metal are used as transmission media of the signal, there is no adverse influence from multiple reflections as occurring in a conventional reflection system. In addition, the level of the signal is large so that the S/N ratio can be improved.

② Since the two electrodes are merely inserted into the molten metal, an antenna or the like is not necessary, and the level can be measured in a mold having a small section such as billet cc (billet continuous casting).

③ It is possible to measure the level of molten metal widely from a large displacement to a small displacement and it is possible to perform the measurement continuously.

④ Response is quick.

⑤ Wires can be used as the electrodes, so that the cost can be reduced substantially.

What is claimed is:

1. A method of measuring displacement of molten metal comprising the steps of:

inserting first and second electrodes into molten metal having electrical conductivity;

transmitting a first pseudo random signal to said first electrode, and multiplying said first pseudo random signal by a second pseudo random signal which has the same pattern as said first pseudo random signal but which is slightly different in frequency from said first pseudo random signal to thereby calculate a first product value;

multiplying said second pseudo random signal by a signal obtained through said second electrode to thereby calculate a second product value; and calculating displacement of said molten metal on the basis of the time difference between maximum correlation values respectively appearing in time series patterns of said first and second product values.

2. An apparatus for measuring displacement of molten metal comprising:

a first pseudo random signal generating means for generating a first pseudo random signal;

a second pseudo random signal generating means for generating a second pseudo random signal which has the same pattern as said first pseudo random signal but which is slightly different in frequency from said first pseudo random signal;

a first electrode inserted into molten metal having electrical conductivity and connected to said first pseudo random signal generating means;

a second electrode inserted into said molten metal;

a first multiplier for multiplying an output of said first pseudo random signal generating means by an output of said second pseudo random signal generating means to thereby obtain a first product value;

a second multiplier connected to said second electrode and for multiplying an output of said second electrode by the output of said second pseudo random signal generating means to thereby obtain a second product value;

a first integrate operation means for integrating the output of said first multiplier;

a second integrate operation means for integrating the output of said second multiplier; and an arithmetic operation means for obtaining a time difference between maximum correlation values respectively appearing in time series patterns of said first and second integrated values to thereby calculate displacement of said molten metal.

3. An apparatus for measuring displacement of molten metal according to claim 2, wherein said first pseudo random signal generating means is driven by a first clock signal generating means which is constituted by a first oscillator for generating an oscillation of a frequency $\underline{a}$, a common oscillator for generating an oscillation of a frequency $\underline{c}$ sufficiently larger than said frequency $\underline{a}$, a first mixer for mixing the output of said common oscillator with the output of said first oscillator, and a first band pass filter for obtaining an output of a frequency c+a from the output of said first mixer, and wherein said second pseudo random signal generating means is driven by a second clock signal generating means which is constituted by a second oscillator for generating an oscillation of a frequency a' slightly different from said frequency $\underline{a}$, a second mixer for mixing the output of said common oscillator with the output of said second oscillator, and a second band pass filter for obtaining an output of a frequency c+a' from the output of said second mixer.

4. An apparatus for measuring displacement of molten metal according to claim 2, wherein said arithmetic operation means includes means for comparing the first and second integrated values received from said first and second integrate operation means and means for transforming said time difference of said first and second integrated values into displacement differences of a surface level of said molten metal.

5. A method according to claim 1, wherein said signal obtained through said second electrode is generated by passing said first pseudo random signal transmitted to said first electrode through said molten metal to said second electrode.

6. A method according to claim 5, wherein said molten metal is in a container and said molten metal has a surface, said displacement of said molten metal being calculated for outputting values representing changes in level of the surface of said molten metal.

* * * * *